United States Patent [19]
Banner

[11] 3,848,455
[45] Nov. 19, 1974

[54] MAGNETIC COMPASS CORRECTOR MEANS

[76] Inventor: Philip M. Banner, 28 Oxford Rd., Massapequa, L. I., N.Y. 11758

[22] Filed: Mar. 20, 1973

[21] Appl. No.: 343,114

[52] U.S. Cl. ................................................. 73/1 E
[51] Int. Cl. ............................................ G01c 17/38
[58] Field of Search ...................... 73/1 E; 33/356

[56] References Cited
UNITED STATES PATENTS
2,395,528   2/1946   Andersen ............................. 73/1 E
3,320,790   5/1967   Gagne .................................. 73/1 E
3,406,560   10/1968   Michael................................ 73/1 E FOREIGN PATENTS OR APPLICATIONS
292,878   7/1914   Germany............................... 73/1 E Primary Examiner—Donald O. Woodiel

[57] ABSTRACT

A compass correction means for craft comprising a plurality of directionally set spaced markers representing true directions wherein said markers define an enclosure, having electronic signal means associated with said markers so that when a craft is in alignment with a marker point it is signal responsive.

7 Claims, 9 Drawing Figures

MAGNETIC COMPASS CORRECTOR MEANS

This invention relates to a compass correction device needed by boating, navigators and aircraft that rely upon a magnetic compass for course directions. It has been designed to facilitate rapid readings of existing equipment error, particularly on boats. The art of navigation on a boat is dependent upon having the magnetic compass in excellent condition where a navigator can rely upon the accuracy of a magnetic compass with a degree of certainty allowing safe travel. The magnetic compass is the oldest of navigators instruments its origin is unknown. The history of navigation teaches that in 203 BC when Hannibal set sail from Italy, his pilot was described as one peloris. Perhaps the compass was in use then but it is more likely that it was known first in the west. The Norsemen of the 11th century were familiar with it and at about 1200 a compass used by mariners when the pole star was hidden was described and reported by a French poet, Guyot de Provins. The earliest compass comprised a needle thrust through a straw and floated in water in a container. A 1248 writer, Hugo de Bercy spoke of a new compass construction wherein the needle was supported by two floats. There is another recording by Petrus Peregrinus de Maricourt, in his Epistole se Magnete of 1269 who wrote of a floating pivoted compass with a lubber's line and said that it was equipped with sights for taking bearings. The reliability of the magnetic compass of today is a comparatively recent achievement. As late as 1820 Peter Barlow reported to the English Admiralty that half of the compasses in the Royal Navy were mere lumber and should be destroyed. Some 75 years ago, Lord Kelvin developed the type compass used today. The compass card itself dates back to the 14th century when Flavio Gioga of Amalfi attached a sliver of lodestone or a magnetized needle to a card. Of course the compass rose and wind-disc goes way back to the wind rose of the ancients where primitive man named directions by the winds.

While there are many kinds of compasses the one this device primarily concerns itself with is the Mariners Compass, a magnetic compass that aligns itself with the magnetic field of the earth and points to the magnetic North direction. It employes a compass card graduated in 360° composed of non-magnetic materials, increasing clockwise from north through east, south and west. They are marked in cardinal and intercardinal points and are usually of the type as used by the Navy having eight points. Another important example of a magnetic compass widely used today is the one used by hunters, campers and inland fishermen that employ a hand model they depend upon for finding direction. It is interesting to note that the definition of a magnetic compass is a compass depending for its directive force upon the attraction of the magnetism of the earth for a magnet free to turn in any horizontal direction.

The compass error is the angular difference between true north and compass north (the direction north as indicated by a magnetic compass). It is named east to west to indicate the side of true north on which compass north lies. The use of a magnetic compass extends historically into modern times where in certain forms of transportation and sports we depend upon its accuracy for safe travel. The magnetic compass on a small craft is vital to its operation for when a craft is only a couple of miles offshore land is obscured and he must rely upon his knowledge of the sea and his compass. Whether in large bay areas or small narrow channels or offshore a change of wind and temperature causes an immediate fog where the navigator loses visability and must rely upon the magnetic compass. Correction of magnetic compasses is achieved by calling a marine surveyor to calibrate it or by taking headings on known courses or the combination of using a gyro-compass in conjunction with the magnetic compass, a timely, costly operation that requires a knowledge of the compass to achieve the results. Further, compass error is induced by wearing apparel of a navigator or passengers wearing nylon clothes, by tools and paint cans or electrical interferences, improperly maintained compasses and other reasons.

Accordingly, a principal object of the invention is to provide a new and improved method of correcting magnetic compasses on boats and airplanes, also helpful in correcting gyroscope compasses.

Another object of the invention is to provide a means of correcting magnetic compasses for other users such as campers, fishermen and hunters.

These and other objects of the invention will be apparent to the following specifications and drawings, of which, FIG. 1 is a top plan view of an embodiment of the invention showing the device and its relationship the the points of the compass.

Figure 1:
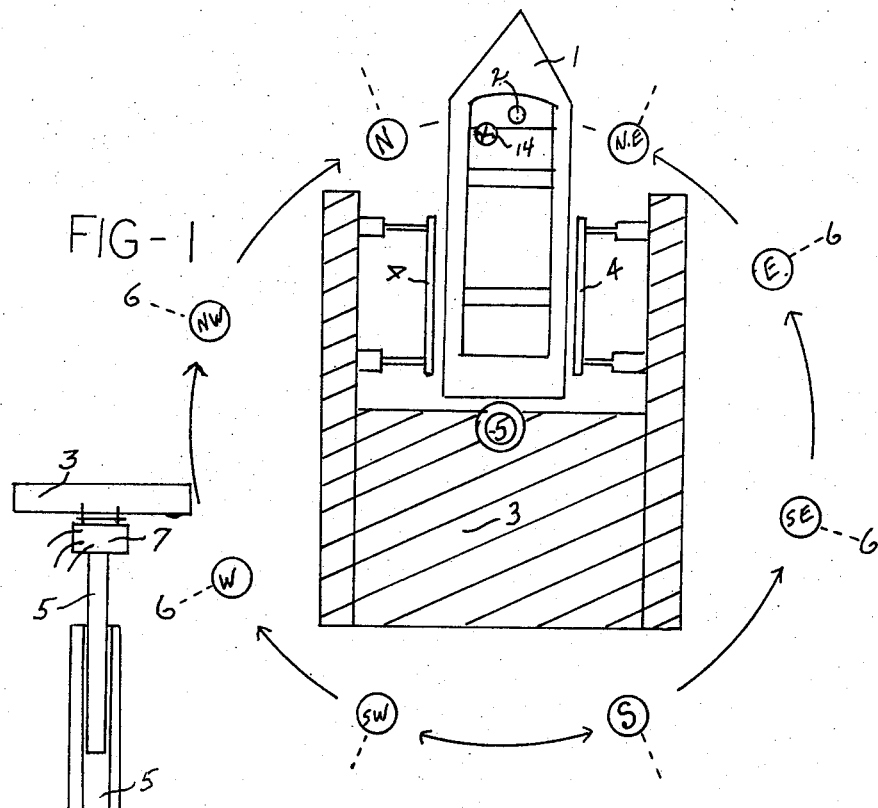
Figure 2:
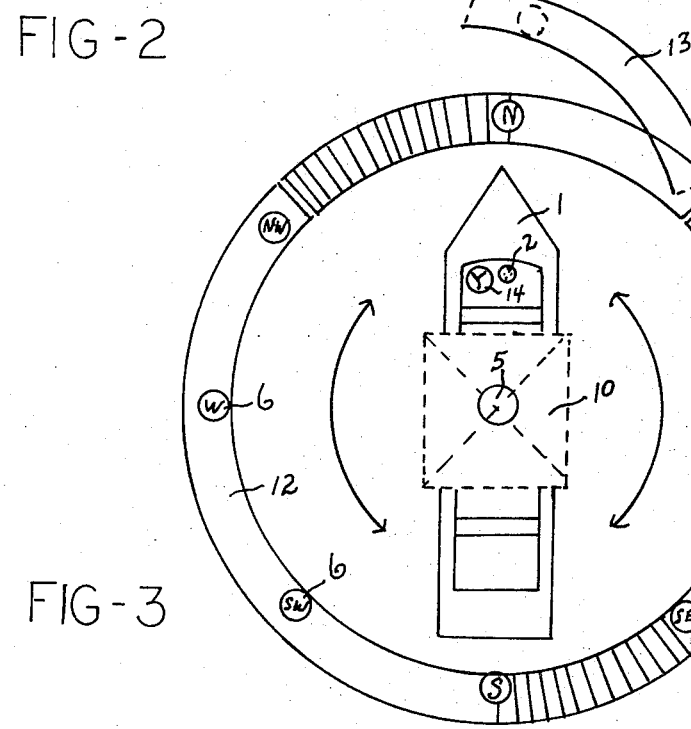
FIG. 2 is a side view of a modification of the invention.
Figure 3:
FIG. 3 is a top plan view of an embodiment of the invention showing a movable dock arrangement and compass points.
Figure 4:
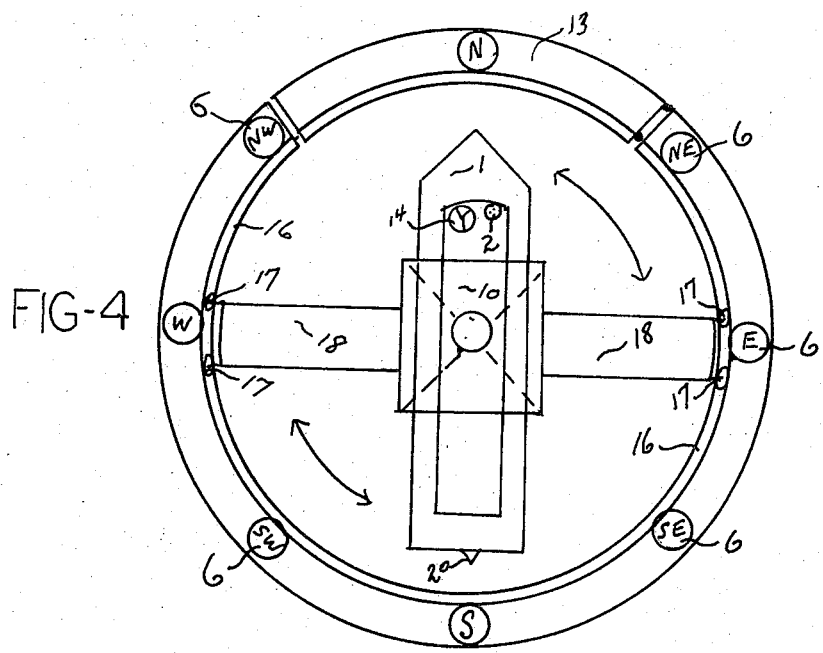
FIG. 4 is a top plan view of a modification of the invention.
Figure 5:
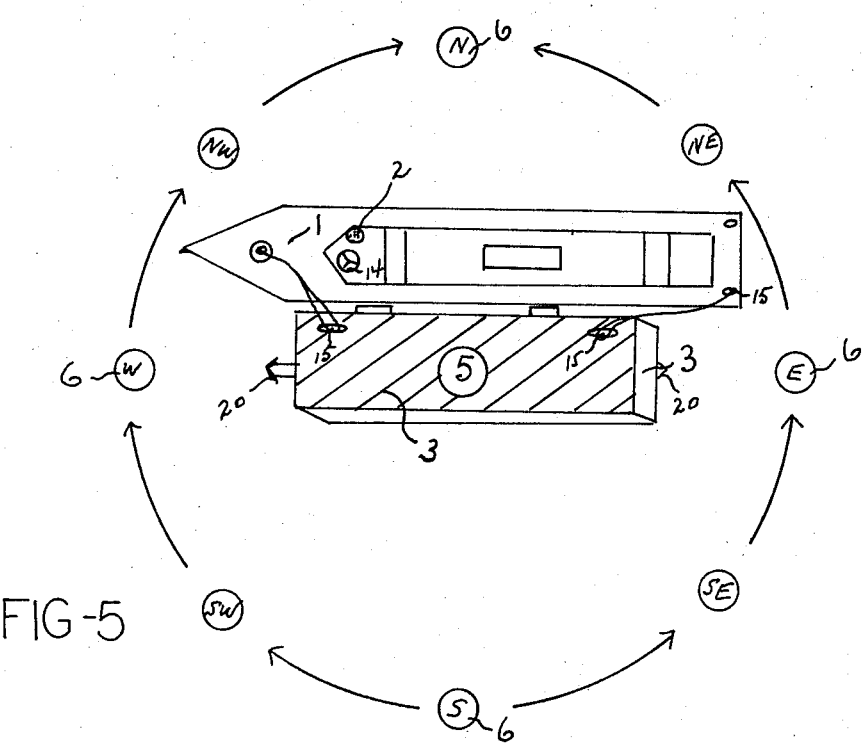
FIG. 5 is also a top plan view of a modification of the invention.
Figure 6:
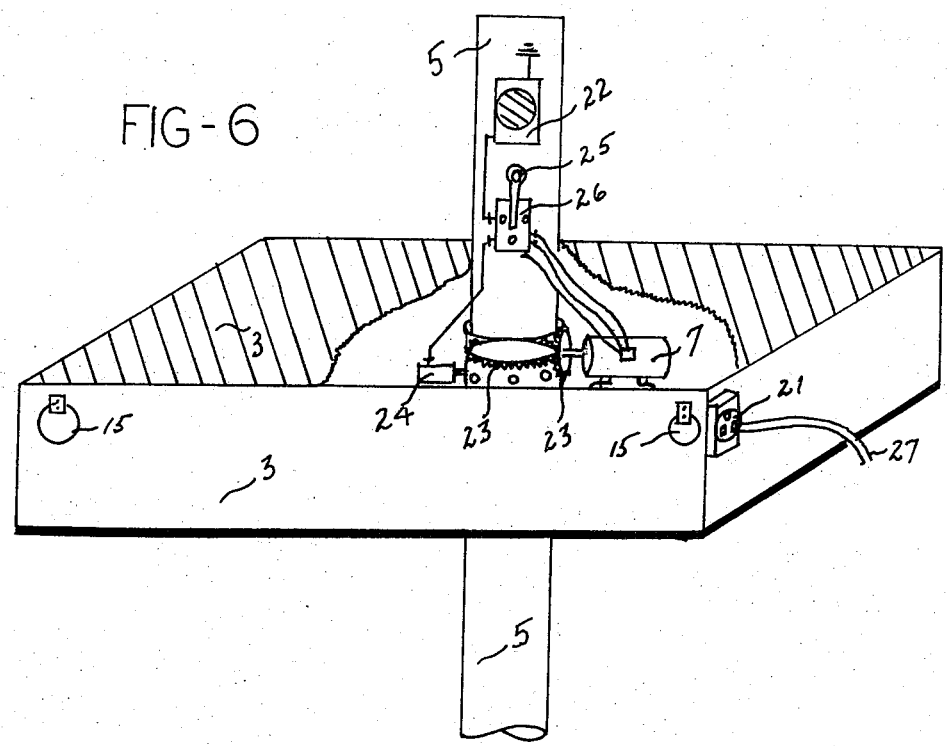
FIG. 6 is a side view of a modification of the invention.
Figure 7:
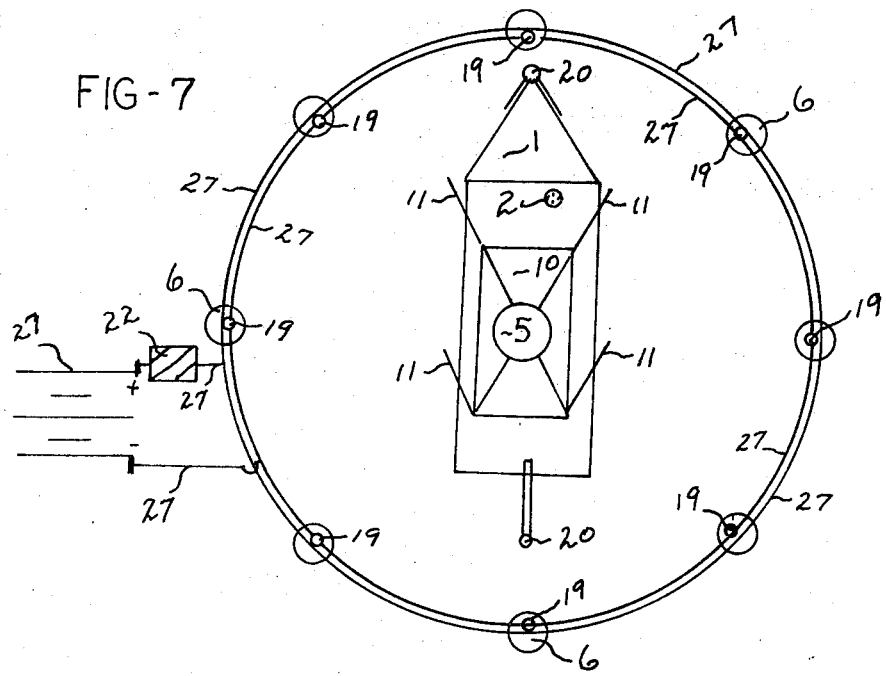
FIG. 7 is a top plan view of a modification of the invention.

FIG. 1 shows a boat 1 having a magnetic compass 2 backed in to a special boat dock or float 3, having boat stabilizing arms 4 operating around a center pivot member 5 which consists in one form as a piling or movable vertical member shown in FIG. 2. Eight compass points are shown as 6 although the desired amount of points will vary with the extent which a magnetic compass correction may be necessary. A motorized means 7 is also shown in FIG. 2 used for directly turning the dock 3. FIG. 3 shows a circular dock 12 with an undercarriage 10 that will support a boat 1 having an opening dock section 13 on circular dock 12. The steering wheel 14 is shown next to the compass 2 on the boat shown in FIG. 3. FIG. 4 shows a modification with a circular track 16 that fit the wheels 17 placed upon the crossmember frame 18 also showing a movable part of the dock 13. In FIG. 5 the ring locks 15 show one means of securing a boat and the dock 3 pivots on the pivot 5, the dock 3 shows direction pointers 20 placed in front and in back of the dock. FIG. 6 displays a floating dock 3 showing a pivot pole 5 having a motorized means 7, boat rings 15, a electric wire receptacle 21, an alarm 22, gears 23 and a selector solonoid 24. The dock movement control handle 25 operates on a forward and reverse electrical switch 26, the electric cable input is shown as 27. In FIG. 7 signal pointer means 19 and 20 are shown in position when a given cardinal point 6 has been aligned. The electric wire 27 is shown without a switch arrangement. FIG. 7 shows the undercarriage 10 having holding position arms 11 in place.

Figure 8:
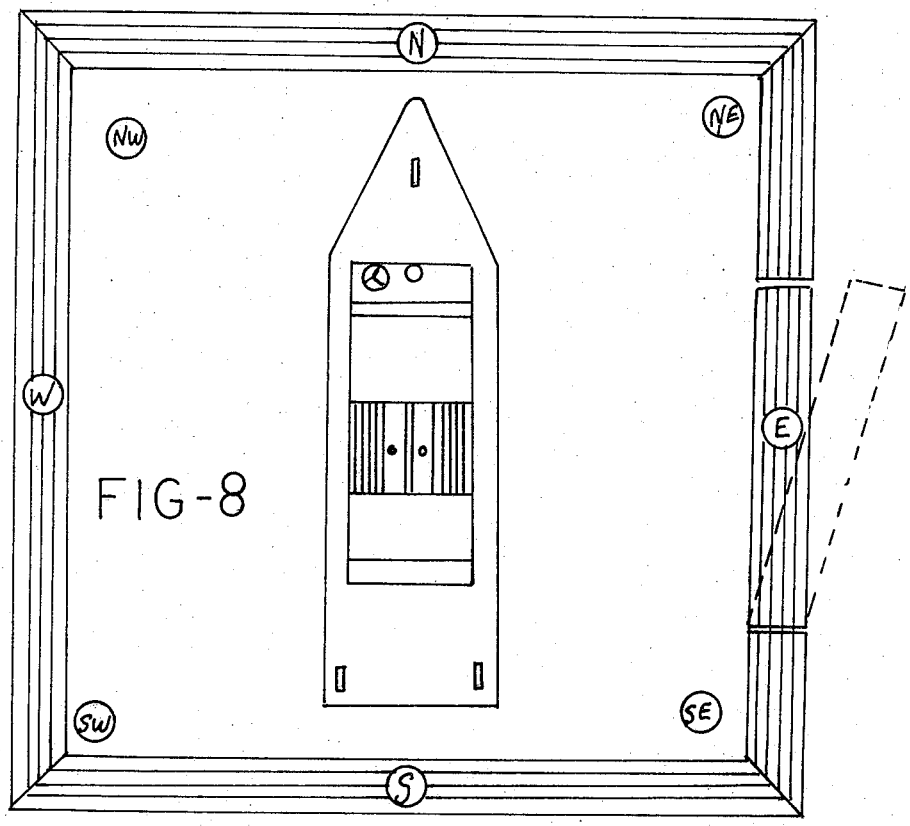
FIG. 8 is a top plan view of an example rectangular enclosure.
Figure 9:
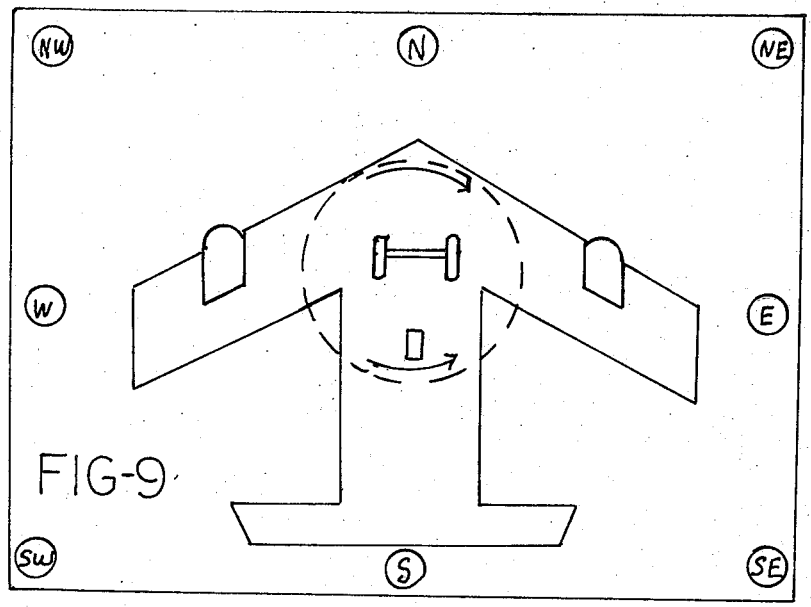
FIG. 9 is a top plan view of a plurality of markers set in spaced relation so that each marker defines a particular compass point and enclosure.

Operationally, the Figures show many models and different arrangements that would accomplish magnetic compass correction. In reviewing FIG. 1, it clearly shows one form of a dock 3 that could be built to different specifications and sizes without departing from the idea in this invention that can be made in modular form and expandable for different sized boats. This Figure shows adjustable arms that will capably hold a craft while being corrected and FIG. 2 shows one form of a slidable pivot arrangement for changing tides. In this position the boat is ready to be turned by an operator manually or by power to align with the intercardinal positions of the compass. The compass points could be placed above the boat or outward from the boat in a peripheral arrangement and have as many locking positions as needed. In this manner a boat is turned clockwise or counterclockwise to line up with each of the pre-set deviated points wherein the boats compass is corrected in that particular position before going to the next position. The arrangement shown in FIG. 2 having a pivot pole 5 that can adjust with the tides. FIG. 3 shows a definite circular dock or float 12, preferably in dock stationary form having an opening 13 large enough to permit a boats entry into the invention. In FIG. 3 the boat is placed upon a cradle 10 and moved to the various positions correcting the boats compass accordingly. The movement of the opening 13 or the cradle carriage 10 is accomplished by manual or power means from AC or DC electric motor. When the boat compass has been corrected to the pre-set compass points shown in FIG. 3, the movable dock is opened to release the boat. FIG. 4 also shows a circular cock arrangement preferably in stationary form, built into the dock 13 having a track around its inside diameter 16 that the wheels 17 of the crossmember frame 18 operate upon. The undercarriage is adjustable 10 to fit many size boats. The movement of the boat 1 to any of the intercardinal positions is effected by moving the entire undercarriage containing the boat in either direction until they line up with the desired compass point. FIG. 5 shows another model of a compass corrector having a floating apparatus 3 operating on a pivot pole 5 manually operated or electric showing pointers 20 that line-up with the compass points that are pre-set around the area. In this figure the compass points can be placed outside the arc of the boat or even above the boat. The boat is secured by rope ring locks 15. FIG. 6 also shows a floating dock 3 with a pivot pole 5 having an electric motor 7, a control solonoid 24 and a remote control handle 25. When each of the pre-set positions are met the alarm 22 signals the operator of the mechanism that the boat is in position for alignment. Markers can be placed upon the float center position which are not shown in this drawing that would line-up correctly for proper bearings. FIG. 7 shows the electrical arrangement of wiring 27 that connects wires to all the pre-set points. At each of the pre-set points a signal means, for example, a photo electric cell is employed as one means to signal alignment. The boat 1 has a part of the photo cell equipment upon the bow that when lined up with the point becomes signal responsive. The stern also shows another signal responsive means if needed that also lines up the stern of the boat. With the both parts in perfect line the boat magnetic compass is ready for correction by adjusting the compass to the correct preset points on the invention. The operation of the device in FIG. 7 can be manual or mechanically or electrically operated. The placement of these preset points to afford the correction of magnetic compasses constitutes a major improvement in the technique that has never changed. FIG. 8 shows a craft within a rectangular shaped area, having a swingable gate opening showing the opening to contain a directional point. In this configuration it would easily be built of modular docks and the placement of markers to define the points of direction are shown around the structure. The distance of the points from the craft would necessarily vary with the strength of the signal means on said point markers and the front and rear of said craft indicating the proper alignment of the craft. FIG. 9 shows an airplane illustration WHERE SAID AIRPLANE is shown within a plurality of markers directionally spaced with respect to a centrally located reference point and defining an enclosure, so that each marker defines a predetermined direction with respect to said reference point, showing means to rotate a craft within said ENCLOSURE ABOUT SAID REFERENCE POINT TO SELECTIVELY line the craft with the markers and reference point for compass correction purposes having signal means on said markers which cooperate with means on the front and rear of said craft to indicate the proper alignment of the craft with each of said markers and the reference point. The distance of the said signal means from said craft would vary with the strength of the signals whether on land, or in the air and on the seas. In the air the signals would be effective when said signal means has been referenced with said markers and the front and rear of said craft. Therefore, the placement of the markers at different points on land away from the craft, or in the air on airborne markers, or upon mountains all constitute the means to provide signal means on markers directionally spaced providing compass correction.

It is conceivable that the invention in various forms can be placed geographically around our shores on lakes, oceans and airports to facilitate the great need for an economical means of correcting compasses of many small craft. This will mean safer travel and cause less accidents and give reasonable assurance that the compass on the boat can reliably become what it was intended to be, a reliable navigational aid. Vibration of engines, accidents, electrical wiring, and many other things cause the compass to be incorrect that requires much care if one is to depend upon its reliability. The correction of a compass found to be incorrect and need of adjustment for deviation due to induced magnetism in symmetrical horizontal soft iron or in asymmetrical horizontal soft iron will be neutralized in installing masses of soft iron. For example; in symmetrical soft iron the correction will be the installation of two masses of soft iron abeam the of the compass, on opposite sides and equidistant from the center. After a compass has been adjusted any remaining constant deviation due to magnetic coefficient is likely to be very small. Correcting a compass such as decribed by this invention removes the problem of heeling error while under way which alters the conditions. For a properly adjusted compass a deviation i so small that no provisions should be made for further removal.

It's important to note that the materials used to build this invention should be preferably of non-magnetic materials for obvious reasons. Other modifications include modular docks placed in position with pre-set points of the compass adjusted correctly of rectangular or round or other design, each having the necessary compass directions for correcting compasses. The placement of poles in a symmetrical arrangement aligning to the points of a compass and wherein the said craft is hand held and hand moved to the respective directions is also claimed in this invention as a means of accomplishing the end result, a corrected compass. This kind of a product will perform a very necessary service to boaters everywhere on lakes and the ocean shores where a change of weather conditions causes fog and poor visability. Sailboats, motorboats and all small craft depend upon the magnetic compass which can easily be corrected by this device economically, saving accidents and unnecessary loss of life and property. Also needed to correct aircraft compasses, and gyros.

From the foregoing description of the invention it will be apparent that a MAGNETIC COMPASS CORRECTION MEANS having unique characteristics is provided. While it has been shown and described it will be apparent to those skilled in the art that changes may be made without departing from the principles and spirit of the invention, the scpoe of which is defined in the apended claims. Accordingly, the foregoing embodiment is to be considered illustrative rather than restrictive of the invention, and those modifications which come within the meaning and range of equivalency of the claims, are included therein.

I claim:

1. Compass correction means for a craft comprising a plurality of markers directionally spaced with respect to a centrally located reference point and defining an enclosure, so that each marker defines a predetermined direction with respect to said reference point; means to rotate a craft within said enclosure about said reference point to selectively line the craft with the markers and reference point for compass correction purposes; and signal means on said markers which cooperate with means on the front and rear of said craft to indicate the proper alignment of the craft with each of said markers and the reference point.

2. Apparatus as in claim 1 wherein the means to rotate the craft is attached to wheels rotated on a track within a enclosure set by said markers.

3. Apparatus as in claim 1 wherein said markers are set temporarily in fixed positions.

4. Compass correction means for craft comprising a plurality of markers set in directionally spaced relation defining a enclosure, each marker defines predetermined direction, and means to rotate a craft for alignment with at least two of said markers, and directional signal means on said markers which cooperate with signal response means on the front and rear of the craft to provide signal means for compass correction.

5. Apparatus as in claim 4 wherein said signal means and signal response means comprises electric signal means on said markers and on the front and rear of said craft so that when said craft is in said alignment said signal response means will come from a connected horn or light, having visual and audio advantages.

6. Apparatus as in claim 4 wherein said signal response means comprises electric photocells attached to said craft and said markers signalling when the craft and markers are in correct alignment.

7. Apparatus as in claim 4 wherein said signal means and signal response means comprises a signal control connected to said markers and electric signal means on the front and rear of the craft.

* * * * *